(No Model.)
H. METSKER.
TRUCK.
No. 300,788. Patented June 24, 1884.
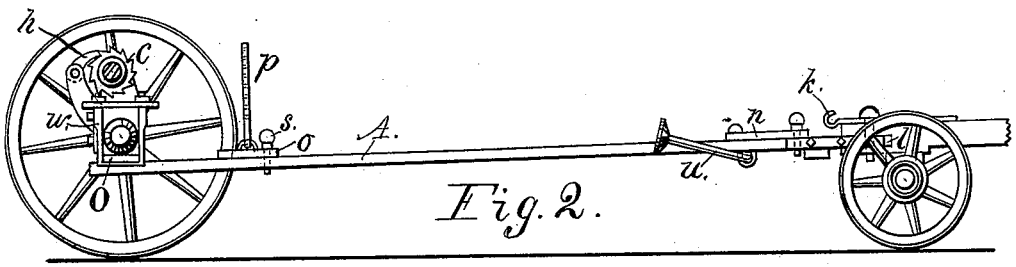
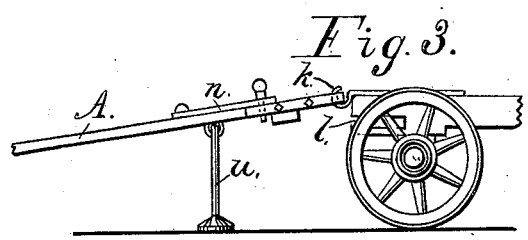
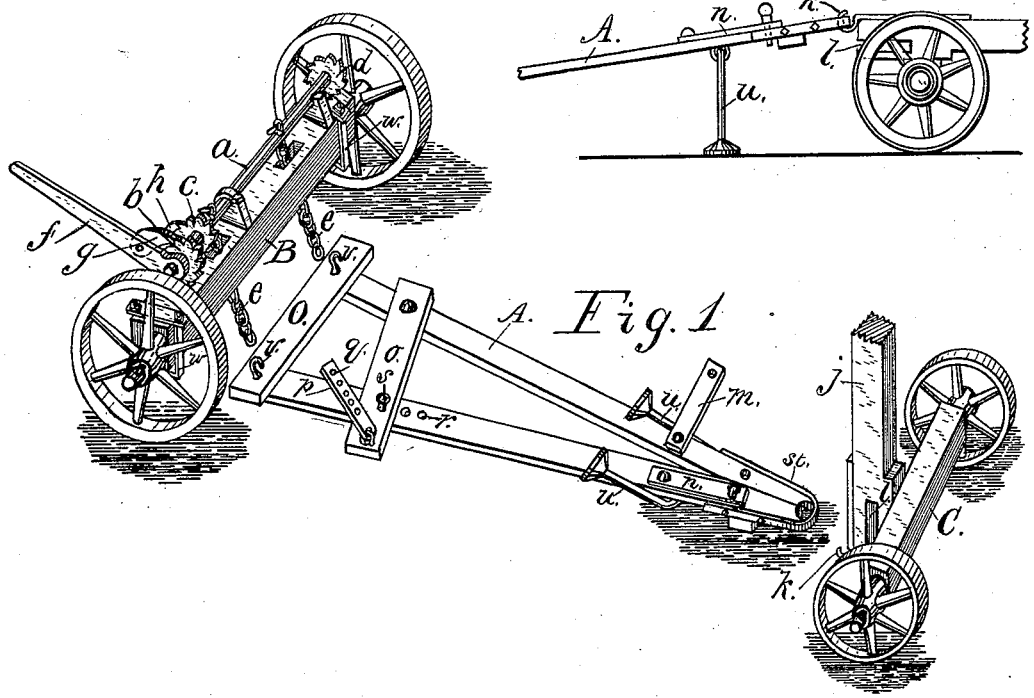
WITNESSES:
E. O. Abbott
Q. P. Hood.
INVENTOR:
Hamilton Metsker
By H. P. Hood
Atty.

UNITED STATES PATENT OFFICE.

HAMILTON METSKER, OF NOBLESVILLE, INDIANA.

TRUCK.

SPECIFICATION forming part of Letters Patent No. 300,788, dated June 24, 1884.

Application filed April 5, 1884. (No model.)

*To all whom it may concern:*

Be it known that I, HAMILTON METSKER, a citizen of the United States, residing at Noblesville, in the county of Hamilton and State of Indiana, have invented a new and useful Improvement in Trucks, of which the following is a specification.

My invention relates to improvements in that class of trucks which are designed for use in moving harvesters from place to place.

The object of my improvements is to facilitate the loading and unloading of the harvester, so that the entire operation can be performed by one man.

The accompanying drawings illustrate my invention.

Figure 1 represents a perspective view of my truck with the carrying-frame separated from the carrying-wheels. Fig. 2 is a side elevation showing the truck in position for moving. Fig. 3 is a partial side elevation.

A is the carrying-frame. B is the rear axle. C is the forward axle. Each axle is provided with a pair of carrying-wheels. On the top of the rear axle is a windlass, *a*, having ratchet-wheels *b*, *c*, and *d*, and chains *e e*, which pass downward through mortises in the axle. Said windlass is designed to be turned by a removable lever and pawl, *f g*, or by a crank applied to the squared end of the windlass. *h* is a pawl engaging ratchet-wheel *c*, for the purpose of preventing the windlass from turning backward. To the forward axle is secured a draft-pole, *j*. Said draft-pole projects rearwardly over the axle, and is provided on said rearward extension with a hook, *k*, and a clevis, *l*. To the upper surface of the carrying-frame A are pivoted a pair of "chocking" blocks, *m* and *n*, and a swinging bar, *o*. To the movable end of bar *o* is attached a link, *p*, having a series of perforations, *q*. Frame A is provided with a series of holes, *r*, arranged concentrically about the pivot which attaches bar *o* to frame A. The purpose of blocks *m* and *n* is to chock the grain-wheel of the harvester, which rests between them, and the purpose of pivoting said blocks to frame A is that they may be swung out of the way when loading and unloading, as hereinafter explained. Bar *o* and link *p* are for the purpose of attaching the harvester to the truck and steadying it thereon when loaded, link *p* being placed between the hounds of the harvester and there secured in place of the draft-pole of the harvester by passing the draft-pole coupling-bolt through one of the perforations in the link. Bar *o* is pivoted to frame A for the purpose of adjusting the swinging end of said bar and link *p* to different styles of harvesters.

The operation of my device is as follows: Frame A, disconnected from both front and rear axles, as shown in Fig. 1, is laid upon the ground in a convenient position, so that the harvester may be drawn across the frame by the team attached thereto. Chocking-block *m* is now swung outward, as shown in Fig. 1, and the harvester is drawn on the frame till the main carrying-wheel of the harvester rests between the sides of the frame A, with the outside of said wheel against the cross-piece O of said frame, and the grain-wheel strikes block *n*. Block *m* is now swung round parallel with the side of frame A, and there secured by a pin passing through into the frame, thereby chocking the wheel on the back side. The draft-pole of the harvester is now removed, and the link *p* is then brought opposite the space between the hounds of the harvester, left vacant by the removal of the draft-pole, and there secured by passing the coupling-pin through one of the perforations in said link. Bar *o* is then secured to frame A by passing pin S through the bar and one of the series, *r*, of holes in the frame. The draft-pole *j* of the truck is now raised until the hook *k* thereon will hook under the strap *s t* on the forward end of frame A. The draft-pole is pulled down and the forward end of the frame raised thereby. As frame A is raised, a pair of legs, *u u*, hinged to said frame, swing downward and support the frame when it is raised, as shown in Fig. 3. Hook *k* is now disengaged from the frame A and the forward axle is coupled to the frame by clevis *l*, and a king-bolt through the frame and said clevis. Rear axle, B, is now run forward until chains *e e* can engage hooks *v v*, secured in frame A. The carrying-wheels on axle B are now locked to the axle by passing a pin, *w*, through the hub of the wheel and through the axle, or by any other suitable means which will temporarily prevent the axle from turning in the wheels. The wheels are now chocked in position, and the operator turns windlass *a*, thereby raising the rear end of the frame and the harvester upon it. For the purpose of firmly securing the frame A to the rear axle, a clip, y, hanging loosely near each end of the axle, is slipped over each end of cross-piece O when the said cross-piece has been closely drawn up against the under side of the axle. Said clips are then tightened, thereby relieving the windlass of all strain when the truck is moving.

I claim as my invention—

1. In a truck, the combination, with two axles provided with carrying-wheels, a windlass on one of said axles, and a truck-frame provided with holes r, and separably connected to said axles, substantially as described, of link p, and bar o, pivoted to said frame and adjustable thereon, substantially as and for the purpose specified.

2. In a truck, the combination, with a frame adapted to be separably connected with a pair of axles, substantially as shown and described, of an axle, a pair of carrying-wheels on said axle, a draft-pole secured to said axle, and provided with a hook, k, and a pair of supporting-legs hinged to said frame, all substantially as and for the purpose specified.

3. In a truck, the combination, with a carrying-frame, of an axle, a pair of carrying-wheels on said axle, and a draft-pole provided with hook k, and clevis l, for the purposes specified.

4. In a truck, frame A, axle B, a pair of carrying-wheels on said axle, means, substantially as described, for locking said wheels to said axle, windlass a, having ratchet-wheels b and c, lever f, pawls g and h, chains e e, and clips y, all combined substantially as and for the purposes specified.

HAMILTON METSKER.

Witnesses:
WILL. A. CRAIG,
D. MOSS.